No. 833,199. PATENTED OCT. 16, 1906.
C. B. CAVE-BROWNE-CAVE.
APPLIANCE FOR SECURING THE RIMS AND TIRES OF VEHICLE WHEELS.
APPLICATION FILED JAN. 2, 1906.
2 SHEETS—SHEET 2
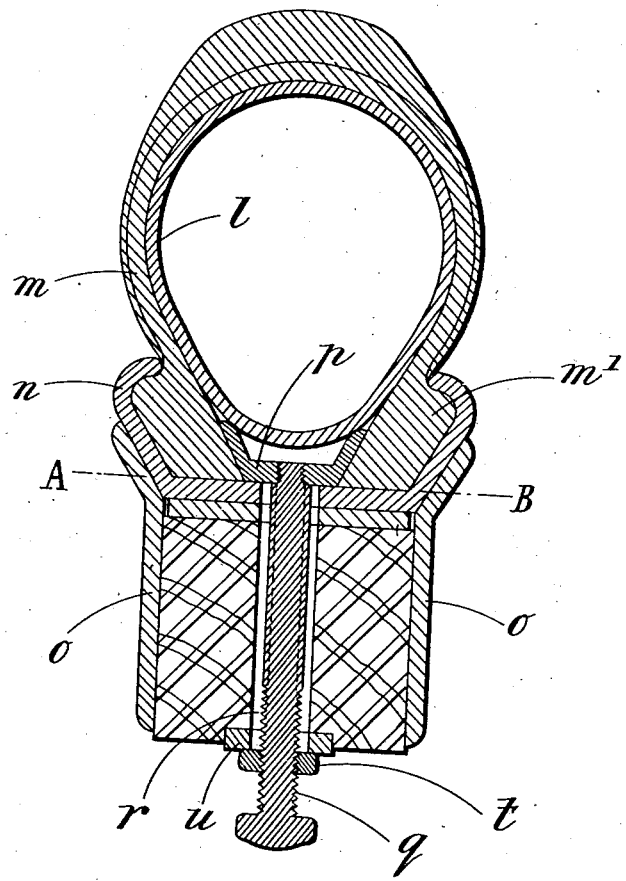
FIG. 7.
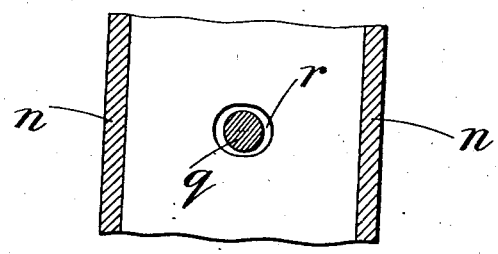
WITNESSES:
Henry J. Brockwell.
H. R. Forster.
INVENTOR:
Cecil B. Cave-Browne-Cave
by J. Ketter
Attorney

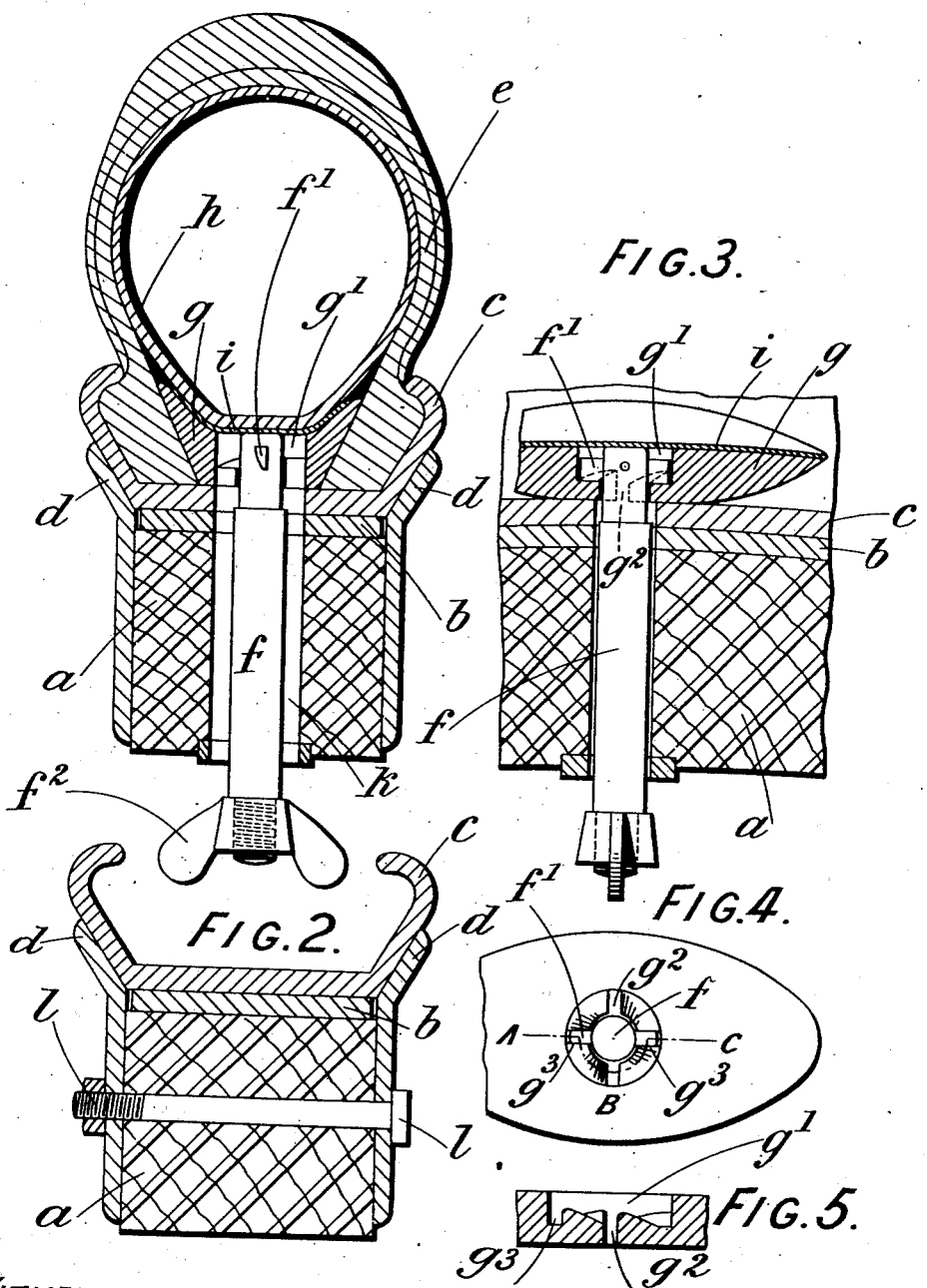

UNITED STATES PATENT OFFICE.

CECIL BECKWITH CAVE-BROWNE-CAVE, OF CHESHAM, ENGLAND.

APPLIANCE FOR SECURING THE RIMS AND TIRES OF VEHICLE-WHEELS.

No. 833,199.

Specification of Letters Patent.

Patented Oct. 16, 1906.

Application filed January 2, 1906. Serial No. 294,212.

*To all whom it may concern:*

Be it known that I, CECIL BECKWITH CAVE-BROWNE-CAVE, a subject of the King of the British Dominions, residing at Chesham, Buckingham, England, have invented certain new and useful Improvements Relating to Appliances for Securing the Rims and Pneumatic Tires of Vehicle-Wheels, of which the following is a specification.

This invention relates to devices for securing pneumatic tires and tire-carrying rims of that class of vehicle-wheels which have a pneumatic tire consisting of an air-tube and an outer cover with beaded edges held in annular recesses of the metallic rim, which tire may be shortly called a "beaded-edge" pneumatic tire. Such rims are sometimes secured to the felly of the wheel by means of detachable side flanges and security-bolts passing radially through the rim and felly, the heads of the said bolts being situated between the edges of the tire-cover and serving to maintain the same in the desired position. Such bolts as they are usually made must be introduced into the radial bolt-holes of the felly from the outer circumference. Consequently it is not practicable to mount the rim on the felly after the tire has been inflated, and much time is lost in removing the tire from the wheel. In order to avoid these defects, I make the bolt-heads detachable, so that the shanks of the bolts can be introduced from the inner circumference of the felly after the bolt-heads have been placed between the edges of the tire-cover and the rim has been mounted on the felly. I also construct the bolt-head and the extremity of the shank in a special manner to facilitate the rapid coupling and separation of the two parts.

In the accompanying drawings, Figure 2 is a radial section through the circumference of a wheel embodying my invention after removal of the tire. Fig. 1 is a similar section, showing the pneumatic tire and one of the security-bolts. Figs. 3 to 5 are detail views of the detachable head of the security-bolt, Fig. 3 being a section at right angles to Fig. 1, Fig. 4 being a plan and Fig. 5 a section along line A B C of Fig. 4. Figs. 6 and 7 represent a modification.

$a$ is an ordinary wooden felly held together by a bonding-band $b$ and carrying an ordinary metallic rim $c$.

$e$ is the outer cover, and $h$ the air-tube, of an ordinary pneumatic tire.

$d\ d$ are a pair of detachable side flanges, which are firmly clamped against the sides of the felly and of the rim by bolts $l$, so as to hold the rim in the correct position. For increasing the grip of the flanges $d$ on the rim $c$ the contact-surfaces between these parts may be roughened, as is the case in some existing wheels.

$f$ is a security-bolt passing radially through the felly and rim and provided with a detachable head $g$ of special construction. Instead of a screw-thread the outer extremity of the bolt $f$ is provided with one or two lateral projections, preferably a pair of side lugs or studs $f'\ f'$, placed diametrically opposite each other, while the head $g$ has a cavity $g'$ and a central opening provided with a pair of diametrically opposite slots $g^2$ large enough for permitting the introduction of the side lugs or projections $f'\ f'$ into the cavity, and two or more teeth $g^3$, arranged in a circle around the central opening, as indicated in Figs. 3 and 5. As indicated by Fig. 4, the teeth radiating from the central opening are preferably one-sided, like the teeth of a ratchet-wheel, one side (the face) of each tooth being approximately parallel with the axis of the bolt $f$, while the other side (the back) is inclined or slightly curved so as to form a helical surface, and the lugs, studs, or projections $f'$ are preferably provided with one-sided knife-edges adapted to enter the said recesses and to rest against the faces of the teeth.

The upper end of the bolt $f$ is introduced through a radial opening in the felly (which is wider in the direction parallel with the wheel-axis than at right angles thereto, and preferably oval in cross-section) and through the central opening of the head $g$ until the lugs $f'$ are above the slots $g^2$ and the extremity of the bolt $f$ abuts against the base of the inflated air-tube $h$ or against a flexible cover or sheet $i$, which covers the central opening of the head $g$ and serves to distribute the pressure of the bolt upon the tube, after which the bolt is turned directly or by means of a thumb-nut $f^2$, situated near the inner circumference of the felly, thereby causing each of the lugs $f'$ to slide up the back or long side of the nearest tooth against the pressure of the tube $h$ until the lower edge of each lug has reached the edge of the corresponding tooth, after which the pressure of the tube upon the bolt causes the lugs $f'$ to snap into the recesses adjoining the teeth and tends to keep them there. A partial turn of the bolt on its axis is therefore sufficient for securing it to the head $g$. For limiting the upward motion of the bolt $f$ the upper extremity is reduced in diameter, so as to form a shoulder adapted to abut against the base of the head $g$, Fig. 3. For withdrawing the bolt it is again turned, (in the same direction as before,) and thereby the lug caused to slide up the back of the following tooth against the pressure of the inflated tire (and, if necessary, over a third tooth in case the head $g$ has more than four teeth) until the lugs $f'$ $f'$ again coincide with the slots $g^2$ $g^2$, in which position the bolt can be withdrawn from the rim and felly through the oblong bolt-hole $k$. For removing the rim and tire from the felly it is only necessary to take off one of the flanges $d$ and detach the bolts $f$ from the heads $g$ in the manner described, after which the tire-bearing rim can be immediately taken off. The head $g$ may have any convenient shape and may be covered with canvas or india-rubber.

The lugs or projections $f'$ may be made in one piece with the bolt, or they may assume the shape of a wedge or cotter passing diametrically through the bolt, as illustrated by the drawings, and they may be round or angular in cross-section. One of the side flanges $d$ $d$ may be permanently fixed to the felly, while the other is attached by means of the bolts $l$ only, and therefore easily detachable.

Instead of continuous flanges $d$, as shown, I may without departing from my invention use a series of segments or angular brackets arranged in pairs right and left of the felly and rim at suitable distances apart, each pair being attached to the felly and pressed against the rim by one or more horizontal screw-bolts.

Fig. 6 is a radial section of a rim and felly, showing a modification, which consists in substituting for the special coupling device or joint between the two parts of the bolt an ordinary screw-thread.

Fig. 7 is a section through the rim and bolt along line A B of Fig. 6. $l$ is the inner tube, and $m$ the cover, of the pneumatic tire. $m'$ represents the beads of the tire-cover. $n$ is an ordinary rim. $o$ represents the side flanges facing the sides of the felly and rim. $p$ is the detachable head, and $q$ the shank of the bolt. $r$ is the oblong bolt-hole through the rim and felly. In this example the bolt $q$ is screwed into the head $p$ and then fixed in its proper position by turning the screw-nut $t$ resting on a washer $u$.

As mentioned above, detachable side flanges have been known, and divided security-bolts have also been known; but the two have never been combined for securing an ordinary rim holding a pneumatic tire, and this combination is essential for rapidly mounting and securing or for rapidly detaching an ordinary rim and tire of the kind described.

Although the special construction of security-bolts described above with reference to Figs. 1 to 5 has been primarily and chiefly designed for use in wheels with wooden fellys and in combination with detachable side flanges, such as $d$ $d$. It is applicable also to other kinds of wheels with pneumatic tires.

What I claim is—

1. In a vehicle-wheel having a detachable metallic rim holding a beaded-edged pneumatic tire, the combination with the felly, of a metallic tire-carrying rim, a pair of side flanges one of which is detachable, and a plurality of divided security-bolts, each being composed of a shank passing radially through the felly and rim and a detachable head situated between the beaded edges of the tire-cover, the whole being constructed and adapted to operate substantially as described and for the purpose specified.

2. In a vehicle-wheel having a detachable metallic rim holding a beaded-edged pneumatic tire, the combination with the felly of a metallic tire-carrying rim, a pair of detachable side flanges adapted to be pressed against the sides of the rim, and a plurality of divided security-bolts, each of which is composed of a shank passing through the rim and felly and a detachable head situated between the edges of the tire-cover and adapted to rest on the circumference of the rim.

3. In a vehicle-wheel having a detachable metallic rim holding a beaded pneumatic tire, the combination with the felly, of a pair of side flanges, one of which is detachable, and a plurality of divided security-bolts passing radially through the felly and rim, the bolt-holes being wider in a direction parallel with the wheel-axis than at right angles thereto, substantially as and for the purpose described.

4. In vehicle-wheels with detachable rims and pneumatic tires, a security-bolt composed of a shank passing radially through the felly and rim and a detachable head situated between the edges of the tire-cover and adapted to fit the circumference of the air-tube, the bolt-head having a cavity facing the air-tube and a narrower central opening for admitting the shank to the said cavity, the said opening having a radial recess and the extremity of the shank having a lateral projection adapted to pass through the said recess into the said cavity, and then to be turned in the same, substantially as described.

5. A security-bolt for detachable pneumatic-tire-carrying rims, composed of a shank passing radially through the rim and felly, and having at its extremity a lateral projection, with a detachable head situated between the edges of the tire-cover and adapted to touch the circumference of the air-tube, the said bolt-head having a cavity facing the air-tube, and a narrower central opening adapted to admit the extremity of the shank into the said cavity, the base of the said cavity having a radial slot adapted to admit the lateral projection of the shank and a radial recess adapted to receive and support the said projection, after the bolt has made a partial turn in the said cavity, substantially as described.

6. A security-bolt for detachable pneumatic-tire-carrying rims, composed of a shank passing radially through the rim and felly, and having at its extremity a lateral projection, with a detachable head situated between the edges of the tire-cover and adapted to touch the circumference of the air-tube, the said bolt-head having a cavity facing the air-tube and a narrower central opening adapted to admit the extremity of the shank into the said cavity, the base of the said cavity having a radial slot adapted to admit the lateral projection of the shank and a series of helically-inclined surfaces arranged round the central opening like a series of ratchet-teeth, which surfaces serve to support the lateral projection of the shank and to impart to the shank a helical motion, when the shank is turned after the introduction of its extremity into the cavity of the bolt-head, substantially as described.

7. A security-bolt for detachable pneumatic-tire-carrying rims, composed of a shank passing radially through the rim and felly, and having at its extremity a lateral projection, with a detachable head situated between the edges of the tire-cover and adapted to touch the circumference of the air-tube, the said bolt-head having a cavity facing the air-tube and a narrower central opening adapted to admit the extremity of the shank into the said cavity, the base of the said cavity having a radial slot adapted to admit the lateral projection of the shank and a radial recess adapted to receive and support the said projection, after the bolt has made a partial turn in the said cavity, and the cavity of the bolt-head being covered with a flexible sheet adapted to distribute the pressure of the shank upon the air-tube, substantially as described.

8. A security-bolt for detachable pneumatic-tire-carrying rims, composed of a shank passing radially through the rim and felly, and having at its extremity a pair of lateral projections, with a detachable head situated between the edges of the tire-cover and adapted to touch the circumference of the air-tube, the said bolt-head having a cavity facing the air-tube and a narrower central opening adapted to admit the extremity of the shank into the said cavity, the base of the said cavity having a radial slot adapted to admit the lateral projections of the shank and a series of helically-inclined surfaces arranged round the central opening like a series of ratchet-teeth, which surfaces serve to support the lateral projections of the shank and to impart to the shank a helical motion, when the shank is turned after the introduction of its extremity into the cavity of the bolt-head, substantially as described.

9. A vehicle-wheel having in combination a wooden felly armed with a bonding-band, an ordinary tire-carrying rim, a beaded-edged pneumatic tire held in the said rim, a pair of side flanges facing the felly and rim, a plurality of bolts adapted to press the side flanges against the sides of the felly and rim, and a plurality of divided security-bolts, each composed of a bolt-head situated between the edges of the tire-cover and a shank adapted to be introduced radially through the felly and rim and then to be secured to the head by a turning motion of the shank, substantially as described.

In testimony whereof I have set my hand hereunto in the presence of two subscribing witnesses.

CECIL BECKWITH CAVE-BROWNE-CAVE.

Witnesses:
J. WETTER,
H. D. JANESON.